(12) United States Patent  
Braam et al.

(10) Patent No.: US 10,397,146 B2  
(45) Date of Patent: *Aug. 27, 2019

(54) MONITORING INSTANT MESSAGING USAGE

(71) Applicant: International Business Machines Corporation, Armonk, NY (US)

(72) Inventors: Carl A. Braam, Chapel Hill, NC (US); David M. Ogle, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 551 days.

This patent is subject to a terminal disclaimer.

(21) Appl. No.: 14/862,521

(22) Filed: Sep. 23, 2015

(65) Prior Publication Data

US 2016/0014055 A1 Jan. 14, 2016

Related U.S. Application Data

(63) Continuation of application No. 11/961,288, filed on Dec. 20, 2007, now Pat. No. 9,177,295.

(51) Int. Cl.
| | |
|---|---|
| *H04L 12/58* | (2006.01) |
| *G06Q 10/10* | (2012.01) |
| *H04M 15/00* | (2006.01) |
| *H04W 4/24* | (2018.01) |

(52) U.S. Cl.
CPC ........... *H04L 51/04* (2013.01); *G06Q 10/107* (2013.01); *H04L 51/24* (2013.01); *H04M 15/00* (2013.01); *H04M 15/57* (2013.01); *H04W 4/24* (2013.01); *H04M 2215/208* (2013.01)

(58) Field of Classification Search
CPC ........ H04L 51/04; H04L 51/24; H04M 15/57; H04M 15/00

See application file for complete search history.

(56) References Cited

U.S. PATENT DOCUMENTS

| | | |
|---|---|---|
| 5,719,928 A | 2/1998 | Pinnell et al. |
| 6,023,499 A | 2/2000 | Mansey et al. |
| 7,720,952 B2 | 5/2010 | Miyata et al. |
| 2002/0046243 A1 | 4/2002 | Morris et al. |
| 2003/0193961 A1 | 10/2003 | Moore et al. |

(Continued)

OTHER PUBLICATIONS

U.S. Appl. No. 11/961,288, Non-Final Office Action, dated Oct. 1, 2009, 19 pg.

(Continued)

*Primary Examiner* — Thai Nguyen  
(74) *Attorney, Agent, or Firm* — Cuenot, Forsythe & Kim, LLC (57) ABSTRACT

A method of monitoring instant messaging usage can include identifying an instant messaging session between a plurality of participants, selecting a participant in the instant messaging session, identifying at least one attribute of the instant messaging session, and identifying at least one attribute of the selected participant. The method further can include determining an instant messaging usage metric for the selected participant according to the at least one attribute of the instant messaging session and the at least one attribute of the selected participant and outputting the instant messaging usage metric of the selected participant.

20 Claims, 3 Drawing Sheets

(56) References Cited

U.S. PATENT DOCUMENTS

| | | |
|---|---|---|
| 2004/0228277 A1 | 11/2004 | Williams |
| 2005/0149622 A1* | 7/2005 | Kirkland ................. H04L 51/04 709/207 |
| 2005/0165891 A1 | 7/2005 | Moody et al. |
| 2005/0238156 A1 | 10/2005 | Turner |
| 2006/0149818 A1 | 7/2006 | Odell et al. |
| 2007/0143433 A1 | 6/2007 | Daigle |
| 2008/0250109 A1 | 10/2008 | Jakobson |
| 2009/0049135 A1 | 2/2009 | O'Sullivan et al. |
| 2009/0164622 A1 | 6/2009 | Braam et al. |

OTHER PUBLICATIONS

U.S. Appl. No. 11/961,288, Final Office Action, dated May 12, 2010, 11 pg.
U.S. Appl. No. 11/961,288, Non-Final Office Action, dated Sep. 24, 2010, 13 pg.
U.S. Appl. No. 11/961,288, Non-Final Office Action, dated Mar. 18, 2011, 18 pg.
U.S. Appl. No. 11/961,288, Final Office Action, dated Aug. 18, 2011, 22 pg.
U.S. Appl. No. 11/961,288, Examiner's Answer to Appeal Brief, dated Mar. 14, 2012, 24 pg.
U.S. Appl. No. 11/961,288, Decision on Appeal, dated Apr. 15, 2015, 9 pg.
U.S. Appl. No. 11/961,288, Notice of Allowance, dated Jun. 22, 2015, 7 pg.

* cited by examiner

MONITORING INSTANT MESSAGING USAGE

CROSS-REFERENCE TO RELATED APPLICATIONS

This application is a Continuation of U.S. application Ser. No. 11/961,288, filed on Dec. 20, 2007.

FIELD OF THE INVENTION

The embodiments of the present invention relate to instant messaging systems and, more particularly, to monitoring the usage of instant messaging applications.

BACKGROUND OF THE INVENTION

Instant messaging (IM) has become a ubiquitous presence in home, work, and government settings. Although IM applications have existed since the early 1970's, the wider acceptance of IM occurred in the 1990's as Internet service providers began packaging these tools as a part of their service. As the popularity of IM grew, many online networks and websites began to add IM, without charge, as a feature to develop a larger customer base. The ability to have real time communications via the same vehicle used for work and entertainment activities, led to IM applications being accepted as preferred means of communication.

Initially a text based method of communication which allowed users to exchange messages in real time via a chat window, IM has expanded in form. Presently, IM applications allow the exchange of Web site universal resource locators (URLs), data file sharing, photograph and video file sharing, as well as real time voice and video (e.g. Web-cam) sessions. The immediacy of IM, the ability to save a log of text exchanges during the IM session, and the status of IM as a free medium, have led to IM being as commonplace as the telephone, electronic mail, teleconferencing, and video-conferencing.

The expansion of IM use as a communications medium and the increased number of real time applications available under the IM format or family, have led to IM applications consuming larger quantities of bandwidth and computing resources.

BRIEF SUMMARY OF THE INVENTION

The embodiments disclosed herein relate to measuring instant message usage. One embodiment of the present invention can include a method of monitoring instant messaging usage. The method can include identifying an instant messaging session between a plurality of participants, selecting a participant in the instant messaging session, identifying one or more attributes of the instant messaging session, and identifying one or more attributes of the selected participant. The method further can include determining an instant messaging usage metric for the selected participant according to the attribute(s) of the instant messaging session and the attribute(s) of the selected participant, and outputting the instant messaging usage metric of the selected participant.

Another embodiment of the present invention can include a method of monitoring instant messaging usage. The method can include identifying an instant messaging session between a plurality of participants, selecting a participant in the instant messaging session, identifying a type of data exchanged during the instant messaging session, and identifying an organizational attribute of the selected participant. The method further can include determining an instant messaging usage metric for the selected participant according to the data type of the instant messaging session and the organizational attribute of the selected participant, and outputting the instant messaging usage metric of the selected participant.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With the growth of instant messaging (IM) applications has come an expanded use of organizational computing resources to support IM applications. These resources can include servers, storage devices, computing devices, network bandwidth, fees for Internet services, and the like. As the consumption of computing resources by IM applications increases, it can become useful for organizations to track the quantity and types of resources consumed.

Since this consumption may no longer be trivial, it can be essential to assess costs to various groups within an organization. The ability to monitor and measure IM resource usage by the various groups within the organization can allow an equitable assignment of IM usage costs to each group.

The embodiments described herein, can provide a method of monitoring instant messaging usage by a selected participant in an IM session. Attributes of the selected participant in the IM session, attributes of the other participants in the IM session, and attributes of the IM session itself can be identified. In addition, an instant messaging usage metric may be determined based upon at least one of the aforementioned attributes.

Figure 1:
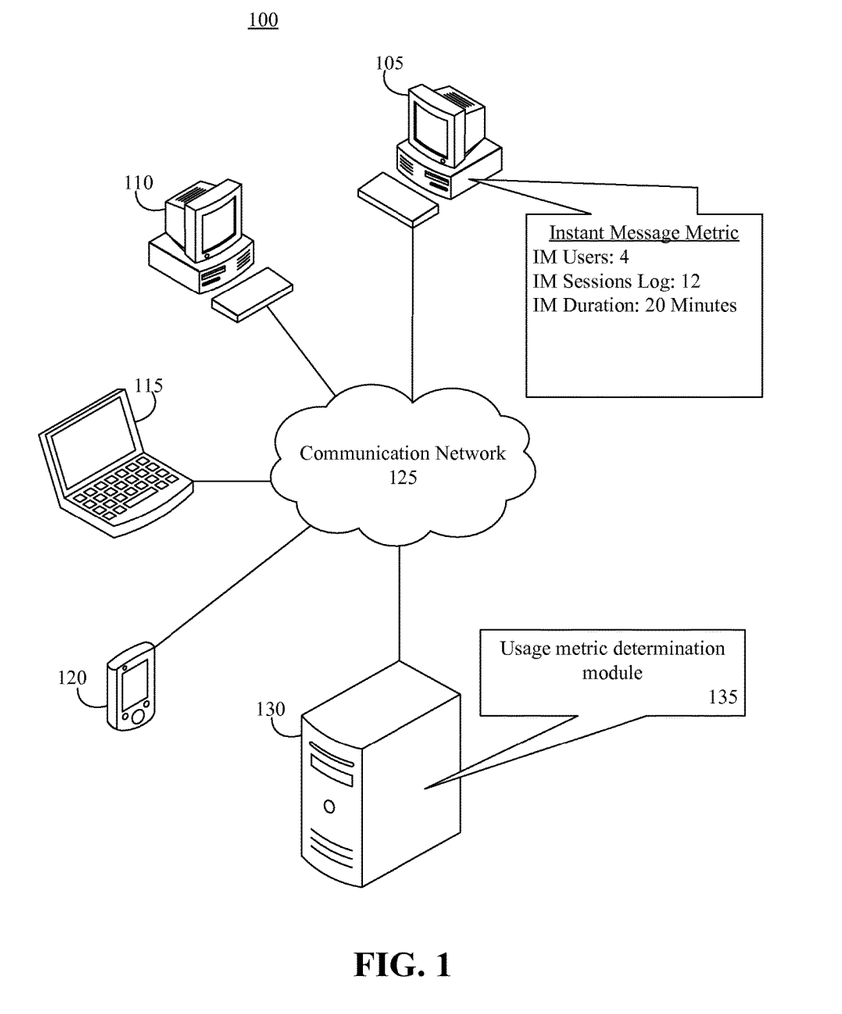
FIG. 1 is a block diagram illustrating a system for monitoring instant messaging usage in accordance with one embodiment of the present invention.

FIG. 1 is a block diagram illustrating a system for monitoring IM usage in accordance with one embodiment of the present invention. The system 100 can include data processing systems 105, 110, 115, and 120, a communication network 125, an instant messaging (IM) server 130, and a usage metric determination module 135.

The data processing systems 105-120 can be any computing device capable of executing an IM client. The data processing systems 105-120 can be implemented as, but are not limited to, a personal computer, a workstation, a wired or wireless handheld device, a touch screen device, a telephone, an entertainment or broadcast media device, an information kiosk, or any other device capable of executing an IM client or functioning in such capacity.

As used herein, IM can refer to instant messaging where real time communication and information exchange is carried out between two or more IM clients over a communication network. Within an IM session, various types of data may be exchanged. For example, text, digital files, real time video, real time audio, and the like all may be exchanged within the context of an IM session between two or more IM clients.

The communication network 125 can facilitate communications between the various data processing systems 105-120 as well as the IM server 130. The communication network 125 can be implemented as, or include, without limitation, a WAN, a LAN, the Public Switched Telephone Network (PSTN), the Web, the Internet, and one or more intranets. The communication network 125 further can be implemented as or include one or more wireless networks, whether short or long range, and/or mobile.

The IM server 130 can be any data processing system or device capable of performing IM server or executing IM server software, within the network architecture. For example, the IM server 130 can determine presence on the communication network 125 and facilitate IM sessions by routing messages and facilitating information exchange during such sessions between the various data processing systems 105-120, each executing IM clients.

The IM server 130 further can execute a usage metric determination module 135. The usage metric determination module 135 can detect and monitor active IM sessions. The usage metric determination module 135 can identify participants in the IM sessions, attributes of the IM sessions, and attributes of the participants in the IM sessions. In addition, the usage metric determination module 135 can determine relationships between IM participants attributes and IM session attributes. The usage metric determination module 135 can include, or access, for example, a series of user profiles and/or organizational information specifying an organizational hierarchy.

In illustration, an IM session can involve three participants, one being a group leader, in an IM videoconference lasting 20 minutes in which documents are exchanged. Monitoring this IM session from the perspective of the group leader, four attributes may be identified, a duration of the IM session (e.g. 20 minutes), a number of participants in the IM session (e.g. 3), an organizational role of the participant (e.g. group leader) and a data type of the IM session (e.g. videoconferencing, data file exchanges). The usage metric determination module 135 can utilize the attributes within a cost function and determine a usage metric for one or more participants of the IM session.

In another embodiment, the usage metric determination module 135 can weight the effects of each participant attribute and IM session attribute when determining the IM usage metric. It should be noted that the IM usage metric can be viewed as a cost or assessment of IM usage. As such, weighting an attribute can influence the rate at which that cost or assessment is accrued. For example, a group wanting to reduce IM usage for personal rather than business discussions may increase the weighting of the IM session duration time attribute within the usage metric calculation when the IM session includes a participant that is not a member of the group.

The usage metric determination module 135 also can dynamically update the IM usage metric for each succeeding IM session involving the selected participant. In addition, upon determination of the IM usage metric, the usage metric determination module 135 can output the IM usage metric of the selected participant. As used herein, "output" or "outputting" can include, but is not limited to, writing to a file, storing in memory, writing to a user display or other output device, playing audible notifications, sending or transmitting to another system, exporting, or the like.

Figure 2:
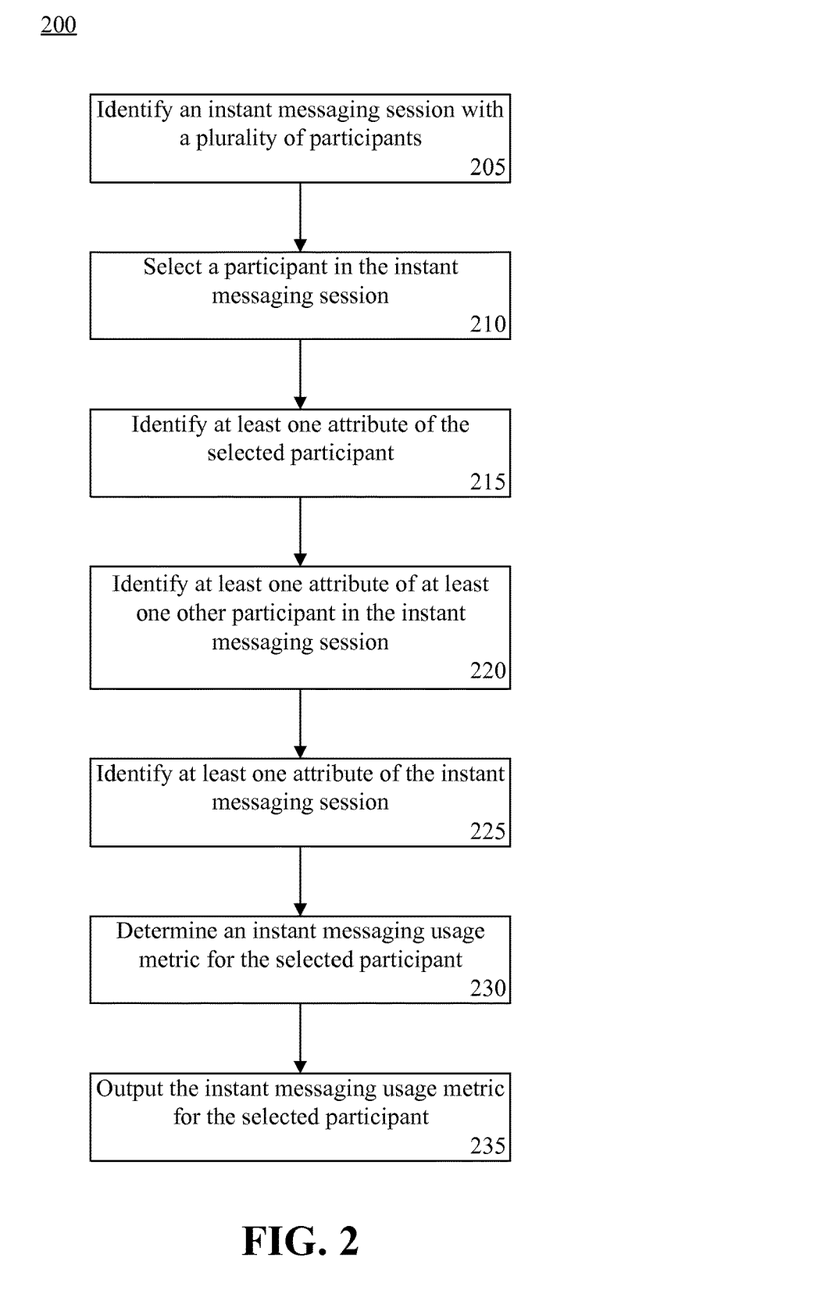
FIG. 2 is a flow chart illustrating a method of monitoring instant messaging usage in accordance with another embodiment of the present invention.

FIG. 2 is a flow chart illustrating a method of monitoring IM usage in accordance with another embodiment of the present invention. The method 200 can be implemented using a system as described in FIG. 1 or any other system with the same or similar functionality. Beginning in step 205, the method 200 can identify an IM session between a plurality of participants. In step 210, a participant in the IM session can be selected. Although described herein from the perspective of a selected participant, it should be noted that the method 200 can be applied to each participant in the IM session. Further, the method 200 may monitor IM sessions and dynamically update IM usage information for each participant of the IM session and for multiple IM sessions concurrently.

In step 215, at least one attribute of the selected participant can be identified. Attributes of the selected participant may include, but are not limited to, demographic information related to the selected participant, an organizational role of the selected participant, a seniority level of the selected participant within an organization, an occupational position of the selected participant, and whether the selected participant may be a sending or a receiving participant. For example, the selected participant can be a manager for an Internet service provider with five years of experience, sending a data file to a colleague. Using this example, in step 215, three participant attributes, seniority (e.g. 5 years), occupational position (e.g. manager), and sending participant, can be identified for the selected participant.

In step 220, at least one attribute of at least one other participant in the IM session can be identified. Attributes of the other participant may be similar to the attributes of the selected participant. The attributes of the other participant, however, may be used to establish a relative relationship of the other participant to the selected participant. For example, the method 200 may weight IM session time used by the selected participant differently when the IM session of the selected participant is with a company owner as opposed to an IM session with a special assistant of the owner. In another example, all members of a work group may have unlimited usage time when having IM sessions with other members of the work group.

In step 225, at least one attribute of the IM session can be identified. Attributes of the IM session may include, but are not limited, a total number of IM sessions, a number of IM sessions within a defined time period, a number of IM sessions per participant or group, a duration time of the IM session, a number of participants in the IM session, a data type of the IM session, bandwidth consumed during the IM session, a communication channel for the IM session, a number of IM messages, and a number of IM sessions. For example, the selected participant may have an IM videoconference with three staff members for 10 minutes via a digital subscriber line (DSL) connection. As a result, the IM session attributes data type (e.g. video-conference), IM session duration time (e.g. 10 minutes), number of participants (e.g. 3), and communications channel (e.g. DSL) can be identified.

As used herein, the phrase "communications channel" can refer to the pathway or medium through which the IM session is facilitated, such as WLAN, cellular, cable, DSL, and the like. The data type attribute may be a composite attribute reflecting one or more of the different data types exchange during an IM session. For example, real time video may be more costly than real time audio. Both may be more costly than sending a word processing document. The data type of the IM session may include a value determined and/or weighted according to each different file or data type exchanged among participants during the IM session.

It should be appreciated that the data type also will influence the bandwidth utilized during an IM session. In addition to bandwidth, a quality of service (QOS) metric may be used. The QOS metric can impose a greater cost in different forms of real time communication. For example, if one wishes to have a higher quality video conference, e.g., a higher QOS, that IM session may be more costly than had a lower QOS been utilized or requested.

In step 230, the method 200 can determine an IM usage metric for the selected participant. The IM usage metric can be determined using at least one attribute of the participant and/or at least one attribute of the IM session. The participant and IM session attributes may be given different weighting in determining the IM usage metric. For example, the organizational position of the participant may play a larger role than the number of IM sessions in determining the IM usage metric. Further, the weight given to the attribute may scale according to the position of the selected participant within the organization. In another embodiment, the particular organizational position of the selected participant may alter the weight of the IM session attribute in determining the IM usage metric. For example, IM usage duration time may be calculated at a rate three times greater for a contractor working at a company than for the CEO of the company.

In another embodiment, an allotment of IM usage may be given to the selected participant. In addition, one may be assigned more than one allotment of IM usage, where each allotment is related to a particular usage attribute or a particular combination of attributes. The different allotments can be decremented independently according to IM usage and the attributes utilized by the user, e.g., organizational attributes and/or attributes of the IM session itself. Upon expending the usage allotment, an alert can be output to the selected participant.

For example, a company president may be allotted unlimited IM usage or a company employee may be given an unlimited IM text usage allotment, but a restricted or limited IM video usage. Further, the use of allotments and the determination of the IM usage metric can be used to determine a fee or resource charge for IM usage. This determination may involve a direct fee for IM usage or the determination of IM usage metrics by subgroups within an organization. For example, the IM usage metric can be used to determine IM service fees for an Internet service provider or by an information technology group inside a company wanting to determine IM resource charges for various departments within the company.

In step 235, the IM usage metric for the selected participant can be output. In one embodiment, the IM usage metric can be graphically displayed in a chat window of an IM application. In addition, the graphical display may be dynamically updated with each successive IM session involving the participant and/or display a comparison of participant IM usage versus an IM usage allotment for the participant.

Figure 3:
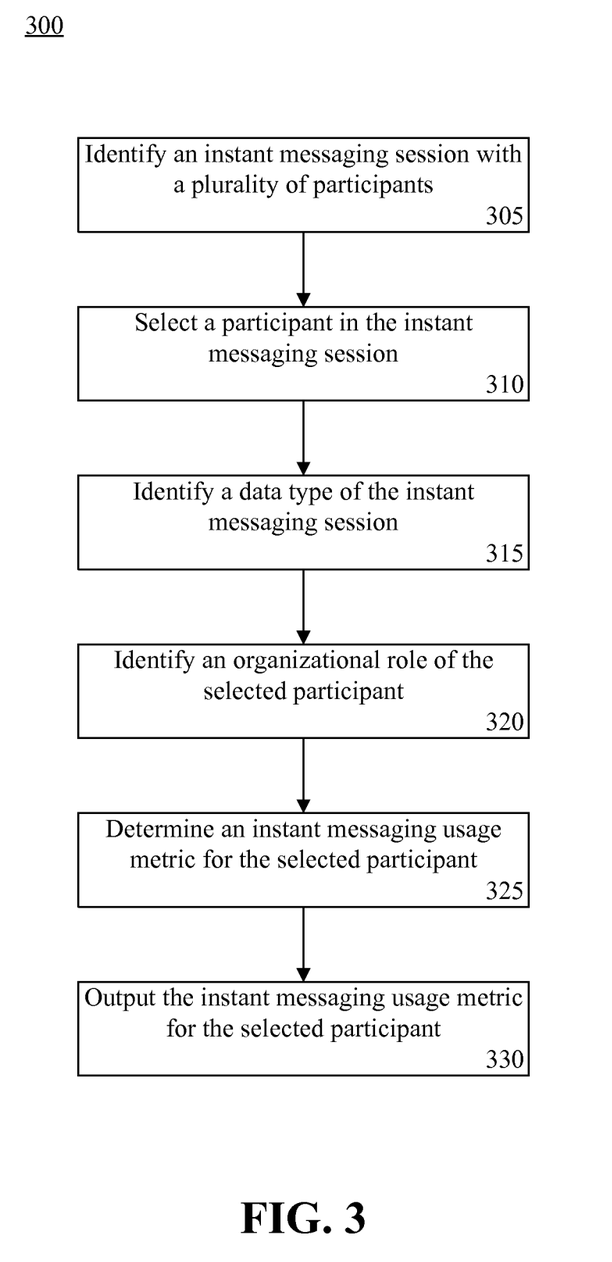
FIG. 3 is a second flow chart illustrating a method of monitoring instant messaging usage in accordance with another embodiment of the present invention.

FIG. 3 is a flow chart illustrating a method of monitoring IM usage in accordance with another embodiment of the present invention. The method 300 can be implemented using a system as described in FIG. 1 or any other system with the same or similar functionality. Beginning in step 305, an IM session with a plurality of participants can be identified. In step 310, a participant in the IM session can be selected.

In step 315, a data type of the IM session can be identified. The identified data type can include text data, video or photographic data, a voice file, a text file, streaming video or may be a mix of data types. In step 320, an organizational attribute of the selected participant can be identified. The organizational attribute can include the position of the selected participant within the organization, a group or department to which the selected participant belongs, whether the selected participant is a part of the organization or a separate entity working with the organization, a job type the selected participant performs in the organization, or any other organizational distinction the selected participant may have in the organization.

In step 325, an IM usage metric for the selected participant can be determined. The IM usage metric can be determined using the organizational attribute of the selected participant and the data type of the IM session. In determining the IM usage metric, the method 300 can weight the value assigned to a particular data type. For example, downloading a file through an IM application may be given greater weight than a voice chat session when determining the IM usage metric.

Further, when determining the IM usage metric, the method 300 can weight one or more organizational attributes of the selected participant differently. For example, the IM usage metric of a manager might be determined at a lower rate than the IM usage metric of a junior employee. In this regard, an organizational distance may be used, e.g., the distance between two or more persons within an organizational hierarchy that can be determined according to the position of each respective person within that hierarchy. The organizational distance may be utilized in determining cost. For example, a manager may not incur any cost when communicating with a subordinate via IM.

The method 300 can weight the value of the organizational attribute of the selected participant as a function of the data type of the IM session or weight the data type of the IM session as a function of the organizational attribute of the selected participant. For example, a technical support person may be given unlimited IM usage of all data types to troubleshoot a network problem or an employee working with an international team may be given a reduced weighting for usage of an IM videoconferencing application when determining the IM usage metric for the employee.

In step 330, the IM usage metric for the selected participant can be output. In one embodiment, the IM usage metric can be displayed in real time in a chat window of an IM application. In addition, the graphical display may be dynamically updated with each successive IM session involving the participant.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method, comprising:
   selecting a participant in an instant messaging session between a plurality of participants;
   weighting an identified attribute of the instant messaging session;
   weighting an identified attribute of the selected participant; and
   determining, based upon the weighted attributes of the instant messaging session and the selected participant, an instant messaging usage metric for the selected participant.

2. The method of claim 1, further comprising
   dynamically updating the instant messaging usage metric for each succeeding instant messaging session.

3. The method of claim 1, further comprising:
   identifying another participant in the instant messaging session; and
   identifying an attribute of the another other participant.

4. The method of claim 1, wherein
   the identified attribute of the selected participant is whether the selected participant is a sending participant or a receiving participant.

5. The method of claim 1, wherein
   the identified attribute of the instant messaging session is a data type of the instant messaging session.

6. The method of claim 1, further comprising
   determining, based upon the instant messaging usage metric, a fee for instant messaging usage by the selected participant.

7. The method of claim 1, further comprising:
   comparing the instant messaging usage metric for the selected participant to a predetermined instant messaging usage allotment for the selected participant; and
   outputting, upon the instant messaging usage metric exceeding the instant messaging usage allotment, an alert.

8. A computer hardware system, comprising:
   at least one hardware processor configured to initiate the following executable operations:
   selecting a participant in an instant messaging session between a plurality of participants;
   weighting an identified attribute of the instant messaging session;
   weighting an identified attribute of the selected participant; and
   determining, based upon the weighted attributes of the instant messaging session and the selected participant, an instant messaging usage metric for the selected participant.

9. The system of claim 8, wherein the executable operations further include
   dynamically updating the instant messaging usage metric for each succeeding instant messaging session.

10. The system of claim 8, wherein the executable operations further include:
    identifying another participant in the instant messaging session; and
    identifying an attribute of the another other participant.

11. The system of claim 8, wherein
    the identified attribute of the selected participant is whether the selected participant is a sending participant or a receiving participant.

12. The system of claim 8, wherein
    the identified attribute of the instant messaging session is a data type of the instant messaging session.

13. The system of claim 8, wherein the executable operations further include
    determining, based upon the instant messaging usage metric, a fee for instant messaging usage by the selected participant.

14. The system of claim 8, wherein the executable operations further include:
    comparing the instant messaging usage metric for the selected participant to a predetermined instant messaging usage allotment for the selected participant; and
    outputting, upon the instant messaging usage metric exceeding the instant messaging usage allotment, an alert.

15. A computer program product, comprising:
    a computer storage device having stored therein computer usable program code,
    the computer usable program code, which when executed by a computer hardware system, causes the computer hardware system to perform:
    selecting a participant in an instant messaging session between a plurality of participants;
    weighting an identified attribute of the instant messaging session;
    weighting an identified attribute of the selected participant; and
    determining, based upon the weighted attributes of the instant messaging session and the selected participant, an instant messaging usage metric for the selected participant.

16. The computer program product of claim 15, wherein the computer usable program code further causes the computer hardware system to perform
    dynamically updating the instant messaging usage metric for each succeeding instant messaging session.

17. The computer program product of claim 15, wherein the computer usable program code further causes the computer hardware system to perform:
    identifying another participant in the instant messaging session; and
    identifying an attribute of the another other participant.

18. The computer program product of claim 15, wherein
    the identified attribute of the selected participant is whether the selected participant is a sending participant or a receiving participant.

19. The computer program product of claim 15, wherein the identified attribute of the instant messaging session is a data type of the instant messaging session.

20. The computer program product of claim 15, wherein the computer usable program code further causes the computer hardware system to perform
 determining, based upon the instant messaging usage metric, a fee for instant messaging usage by the selected participant.

* * * * *